US012593084B2

(12) United States Patent
Strandborg et al.

(10) Patent No.: US 12,593,084 B2
(45) Date of Patent: Mar. 31, 2026

(54) VIDEO STREAMING SYSTEM AND VIDEO STREAMING METHOD

(71) Applicant: Varjo Technologies Oy, Helsinki (FI)

(72) Inventors: Mikko Strandborg, Hangonkylä (FI);
Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 67 days.

(21) Appl. No.: 18/641,519

(22) Filed: Apr. 22, 2024

(65) Prior Publication Data

US 2025/0330662 A1      Oct. 23, 2025

(51) Int. Cl.
| | |
|---|---|
| *H04N 21/2343* | (2011.01) |
| *H04N 21/234* | (2011.01) |
| *H04N 21/236* | (2011.01) |
| *H04N 21/239* | (2011.01) |
| *H04N 21/4223* | (2011.01) |
| *H04N 21/438* | (2011.01) |
| *H04N 21/485* | (2011.01) |
| *H04N 21/81* | (2011.01) |

(52) U.S. Cl.
CPC ... *H04N 21/2343* (2013.01); *H04N 21/23418* (2013.01); *H04N 21/23614* (2013.01); *H04N 21/239* (2013.01); *H04N 21/4223* (2013.01); *H04N 21/438* (2013.01); *H04N 21/4854* (2013.01); *H04N 21/8146* (2013.01)

(58) Field of Classification Search
CPC ......... H04N 21/2343; H04N 21/23418; H04N 21/23614; H04N 21/239; H04N 21/4223; H04N 21/438; H04N 21/4854
See application file for complete search history.

(56) References Cited

U.S. PATENT DOCUMENTS

| | | | | |
|---|---|---|---|---|
| 2018/0176609 A1* | 6/2018 | Oh | ............................ | H04N 7/01 |
| 2019/0379944 A1* | 12/2019 | Christofferson | ........ | H04L 67/10 |
| 2022/0351342 A1* | 11/2022 | Rassool | .................... | G06T 5/92 |
| 2023/0128243 A1* | 4/2023 | Sundareson | .......... | H04L 65/611 |
| 2025/0117903 A1* | 4/2025 | Varekamp | ................. | G06T 5/60 |

FOREIGN PATENT DOCUMENTS

EP          3780636 A1 *   2/2021   ........... H04N 21/235

* cited by examiner

*Primary Examiner* — Pinkal R Chokshi
(74) *Attorney, Agent, or Firm* — Ziegler IP Law Group, LLC.

(57)          ABSTRACT

Disclosed is a video streaming system with server(s) and client device(s) that are communicably coupled. The server(s) is configured to: receive HDR video content comprising HDR images; analyse dynamic range and colour characteristics; receive, from client device(s), first metadata indicative of viewing conditions of HDR video content; adjust HDR mastering parameters, based on first metadata and analysis; perform HDR mastering and compress HDR images; send to client device, compressed HDR images and second metadata indicative of adjusted HDR mastering parameters. The client device(s) is configured to receive compressed HDR images and second metadata; decompress compressed HDR images; translate pixel values in decompressed images based on second metadata; receive real-world images from camera(s); compose XR images using decompressed HDR images and real-world images; send to server, first metadata for next HDR video content; and display XR images on display(s) of client device.

13 Claims, 2 Drawing Sheets

VIDEO STREAMING SYSTEM AND VIDEO STREAMING METHOD

TECHNICAL FIELD

The present disclosure relates to video streaming systems. Moreover, the present disclosure also relates to video streaming methods.

BACKGROUND

Video streaming systems have revolutionized access and consumption of video content by users. The video content could be television shows, movies, live events, extended-reality (XR) videos, and the like. Presently, the video streaming systems deliver visual or audiovisual experiences across various devices, transcending geographical boundaries and time constraints. Nowadays, requirements for visual quality are growing in video streaming systems. The video content being streamed is often High Dynamic Range (HDR) video content, which utilizes a wider range of brightness levels and colours compared to standard video content.

However, existing video streaming systems are not sufficiently well-developed to transport the HDR video content without perceivable loss of visual quality. Firstly, some existing video streaming systems (for example, video streaming systems employing HDR10 standard) employ a static HDR tone-mapping scheme for mapping dynamic range and colours of HDR images to physical luminosities and colours reproducible by a display. As a result, a maximum brightness and a minimum brightness that can be expressed in a given image shown at the display, stays constant throughout a video stream. Such a tone-mapping scheme fails to properly represent the extended visual range (of luminosity and colours) of the HDR images, and thus provides an underwhelming, unrealistic and non-immersive visual experience. Secondly, some other existing video streaming systems (for example, video streaming systems employing HDR10+ standard, or Dolby Vision, or similar) employ a dynamic HDR tone-mapping scheme for mapping dynamic range and colour of HDR images to physical luminosities and colours reproducible by a display. When such HDR video content is viewed without a compatible display, the HDR video content looks unnaturally saturated to extreme colours, which results in an inaccurate representation of colours. Thirdly, even the dynamic HDR tone-mapping schemes are unable to account for some aspects that are unique to XR HDR streaming use cases, especially when HDR virtual content which is to be mixed with real-world content is streamed by the video streaming systems. In particular, such schemes are unable to account for a manner in which and/or conditions subject to which the HDR virtual content (and specifically, the XR images generated therefrom) is viewed. Resultantly, image quality degradation is so high that it leads to an unrealistic, non-immersive XR viewing experience. For example, in some cases, luminosity of occluded regions of the HDR images causes degradation of a quality of colour reproduction for un-occluded regions of the HDR images. In another example, empty areas of the HDR images also adversely influence tone-mapping parameters of non-empty areas of the HDR images. In yet another example, in many instances bright objects in peripheral vision of a viewer are emphasized more than relatively less bright objects in focus of the viewer. Moreover, compatibility and capabilities of the display also sets practical limits on a range of brightness that can be transported in the HDR video content, which adversely impacts the XR viewing experience. Therefore, in light of the foregoing discussion, there exists a need to overcome the aforementioned drawbacks.

SUMMARY

The aim of the present disclosure is to provide a video streaming system and a video streaming method which transport HDR video content without perceivable loss of visual quality. The aim of the present disclosure is achieved by a video streaming system and a video streaming method for video streaming as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
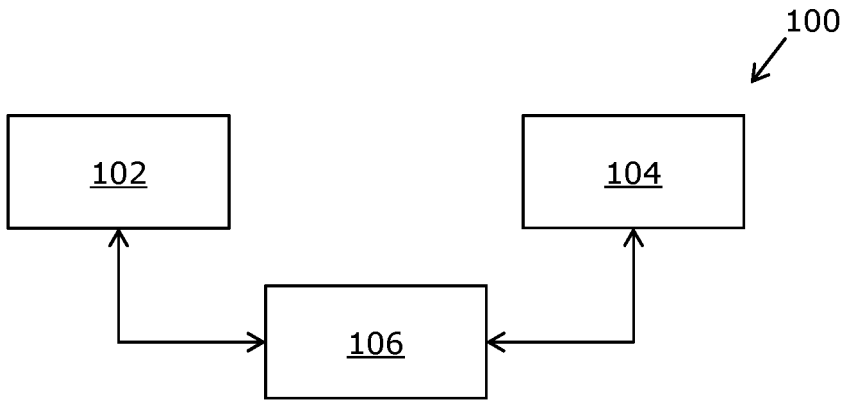
FIG. 1 illustrates a block diagram of an architecture of a video streaming system, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a video streaming system comprising:

at least one server; and at least one client device that is communicably coupled to the at least one server via a communication interface, wherein the at least one server is configured to:

receive high dynamic range (HDR) video content comprising a plurality of HDR images;

analyse a dynamic range and colour characteristics of each HDR image amongst the plurality of HDR images;

receive, from the at least one client device, first metadata indicative of viewing conditions of the HDR video content;

adjust HDR mastering parameters for each HDR image, based at least on the dynamic range and the colour characteristics of said HDR image, and on the first metadata;

perform HDR mastering for the plurality of HDR images according to the adjusted HDR mastering parameters, and compress the plurality of HDR images to obtain a plurality of compressed HDR images;

send, to the at least one client device, the plurality of compressed HDR images and second metadata indicative of the adjusted HDR mastering parameters for each compressed HDR image;

and wherein the at least one client device is configured to:

receive, from the at least one server, the plurality of compressed HDR images and the second metadata;

decompress the plurality of compressed HDR images to obtain a plurality of decompressed HDR images;

translate, based on the second metadata, pixel values in the plurality of decompressed HDR images, into colour values that are to be used for displaying such that upon displaying, pixel luminosities would match luminosities in the dynamic range;

receive real-world images captured by at least one camera;

compose a plurality of extended reality (XR) images using at least the plurality of decompressed HDR images and the real-world images;

send, to the at least one server, at least the first metadata to be utilised for a next HDR video content that is to be streamed from the at least one server to the at least one client device; and display the plurality of XR images, on at least one display of the at least one client device.

In a second aspect, the present disclosure provides a video streaming method implemented by a video streaming system comprising at least one server and at least one client device that is communicably coupled to the at least one server via a communication interface, wherein the method comprises:

at the at least one server receiving high dynamic range (HDR) video content comprising a plurality of HDR images;

analysing a dynamic range and colour characteristics of each HDR image amongst the plurality of HDR images;

receiving, from the at least one client device, first metadata indicative of viewing conditions of the HDR video content;

adjusting HDR mastering parameters for each HDR image, based at least on the dynamic range and the colour characteristics of said HDR image, and on the first metadata;

performing HDR mastering for the plurality of HDR images according to the adjusted HDR mastering parameters, and compressing the plurality of HDR images for obtaining a plurality of compressed HDR images; and sending, to the at least one client device, the plurality of compressed HDR images and second metadata indicative of the adjusted HDR mastering parameters for each compressed HDR image; and at the at least one client device receiving, from the at least one server, the plurality of compressed HDR images and the second metadata;

decompressing the plurality of compressed HDR images for obtaining a plurality of decompressed HDR images;

translating, based on the second metadata, pixel values in the plurality of decompressed HDR images, into colour values that are to be used for displaying such that upon displaying, pixel luminosities would match luminosities in the dynamic range;

receiving real-world images captured by at least one camera;

composing a plurality of extended reality (XR) images using at least the plurality of decompressed HDR images and the real-world images;

sending, to the at least one server, at least the first metadata to be utilised for a next HDR video content that is to be streamed from the at least one server to the at least one client device; and displaying the plurality of XR images, on at least one display of the at least one client device.

The present disclosure provides the aforementioned video streaming system and video streaming method. In the video streaming system and the video streaming method, the first metadata is beneficially provided by the at least one client device to the at least one server (via a return channel of the communication interface), and is effectively utilized by the at least one server for performing HDR mastering. A technical effect of the at least one server adjusting the HDR mastering parameters based on the first metadata is that at least one of: a manner in which the HDR virtual content is viewed, conditions subject to which the HDR virtual content is viewed, is taken into account for performing the HDR mastering. The HDR mastering parameters are accurately adjusted based on the first metadata, so that a dynamic range and colour characteristics of the HDR video content are closely-reproduced at the at least one display, whilst also providing elevated sense of realism and a sense of immersion corresponding to the viewing conditions of the HDR video content. In other words, the HDR video content which is streamed from the at least one server to the at least one client device, has a high quality in terms of HDR reproduction, as well as provision of immersive XR viewing experience. The video streaming system and the video streaming method are easy to implement, and can be used for streaming high-quality HDR video content to multiple client devices.

Throughout the present disclosure, the "video streaming system" refers to a system which delivers a stream of video content to a user of the at least one client device. The video streaming system described herein is an extended-reality (XR) video streaming system which enables provision of a stream of XR images to the user of the at least one client device.

In some implementations, the at least one server is implemented as a remote server. In an example, the remote server could be a cloud server that provides a cloud computing service, and could be arranged in a geographical location that is different from a geographical location of the at least one client device. In other implementations, the at least one server is implemented as a processor of a computing device that is communicably coupled to the at least one client device. Examples of the computing device include, but are not limited to, a laptop, a desktop, a tablet, a phablet, a personal digital assistant, a workstation, and a console. It will be appreciated that the term "at least one server" refers to "a single server" in some implementations, and to "a plurality of servers" in other implementations.

It will be appreciated that the at least one server comprises at least one processor that is configured to implement the aforementioned processing steps associated with the at least one server. Optionally, the at least one processor of the at least one server comprises at least one Graphics Processing Unit (GPU).

The communication interface which communicably couples the at least one server with the at least one client device may be a wired communication interface, a wireless communication interface, or a combination of these. Examples of the communication interface may include, Ethernet, Internet, Wi-Fi, Bluetooth, Near Field Communication (NFC), and the like. It will be appreciated that a bandwidth and a latency of the communication interface is suitable to support provision of a seamless video streaming experience to users.

The at least one client device could be implemented as a display device, or as another computing device serving the display device. Examples of the display device include, but are not limited to, a head-mounted display (HMD) device, and a smartphone. As an example, a smartphone can be inserted into a viewing apparatus made from cardboard, to display image frames to the user. The term "head-mounted display" device refers to a specialized equipment that is configured to present an XR environment to a user when said HMD device, in operation, is worn by a user on his/her head. The HMD device is implemented, for example, as an XR headset, a pair of XR glasses, and the like, that is operable to display a scene of the XR environment to the user. The XR environment is presented by displaying the plurality of XR images on the at least one display of the at least one client device. Herein, the term "extended-reality" encompasses augmented reality (AR), mixed reality (MR), and the like.

Optionally, when the at least one client device is the HMD device, the HDR video content is virtual reality (VR) video content. This means that in this case, the plurality of HDR images represent a plurality of virtual objects. Such virtual objects could be fully computer-generated, computer-enhanced representations of real objects, or similar.

It will be appreciated that the at least one client device comprises at least one processor that is configured to implement the aforementioned processing steps associated with the at least one client device.

Optionally, the at least one server is configured to receive the HDR video content from at least one of: a data repository whereat the HDR video content is pre-stored, an HDR content framebuffer. Optionally, in this regard, the at least one server is communicably coupled to at least one of: the data repository, the HDR content framebuffer. The HDR content framebuffer can be associated with a processor of the at least one server, an external processor that is communicably couped to the at least one server, or similar.

It will be appreciated that each HDR image amongst the plurality of HDR images in the HDR video content, is analysed to determine its luminance range (i.e., brightness range) and colour information, so that eventually the HDR mastering parameters of each image can be adjusted based at least on said information.

Optionally, when analysing the dynamic range of each HDR image amongst the plurality of HDR images, at least one server is configured to at least identify a range of luminosity levels in each HDR image. Furthermore, optionally in this regard, the at least one server is also configured to perform at least one of: identify a distribution of luminosity levels across pixels in each HDR image, identify colour saturation across different luminosity levels in each HDR image; assess noise levels for at least one sub-range of luminosity levels in each HDR image.

Optionally, when analysing colour characteristics of each HDR image amongst the plurality of HDR images, at least one server is configured to at least identify a colour space of each HDR image, and identify a range of colour component values in each HDR image. Furthermore, optionally in this regard, the at least one server is also configured to perform at least one of: identify a distribution of colours in each HDR image, determine colour temperatures in each HDR image;

determine contrast between different colours in each HDR image, measure saturation of colours in each HDR image.

Optionally, the colour space of a given HDR image is one of: a Red-Green-Blue (RGB) colour space, a luminance-chrominance (YUV) colour space, a Hue-Saturation-Value (HSV) colour space, a Cyan-Magenta-Yellow (CMY) colour space. The colour space define how colours are represented (using numerical values, percentages, or similar) and typically comprise a plurality of colour components, different colour components representing a different aspect of colour. The term "colour component" refers to an individual channel (or aspect) of the colour space which contributes towards an overall colour representation in an image. For example, the RGB colour space has three colour components, i.e., a red colour component (R), a green colour component (G), and a blue colour component (B). As another example, the YUV colour space has three colour components, i.e., a luminance colour component (Y) and two chrominance colour components (UV).

The "first metadata" refers to metadata that is received by the at least one server from the at least one client device, such metadata being beneficially utilised by the at least one server for adjusting the HDR mastering parameters for each HDR image according to the viewing conditions indicated in said metadata. The viewing conditions describe how the HDR video content is being viewed at the at least one client device, and it could encompass one or more of: user-related viewing conditions, real-world environment-related viewing conditions, and hardware-related viewing conditions. Notably, the viewing conditions impact a quality with which the HDR video content is perceived by the user of the at least one client device, and thus taking them into account when adjusting the HDR mastering parameters for each HDR image (of the HDR video content) enables the at least one server to perform HDR mastering in a manner that the HDR video content is perceivable with high-quality by the user of the at least one client device.

It will be appreciated that the at least one client device streams the first metadata to the at least one server, such that the first metadata sent at a given time from the at least one client device is utilized for adjusting the HDR mastering parameters for a next HDR image (of a given HDR image being post-processed at the at least one client device) at the at least one server. In other words, the HDR mastering parameters for each HDR image are adjusted based on the first metadata that was previously sent by the at least one client device.

Optionally, the first metadata comprises at least one of: a gaze point of a user's eyes, a size of pupils of the user's eyes, estimated luminosity ranges receivable by the user's eyes, head-pose tracking data indicative of at least a pose of the user's head, lighting conditions in a real-world environment where the real-world images are captured, display screen capabilities. Each of these constituents of the first metadata effectively describe a viewing condition which significantly impacts a quality with which the HDR video content is viewed at the at least one client device.

In this regard, the gaze point of the user's eyes is a point at which the user's eyes are focused, when viewing the HDR video content. A manner in which the gaze point of the user's eyes changes over a period of time is indicative of at least one of: a gaze velocity, a gaze acceleration, a gaze momentum. Furthermore, the size of the pupils of the user's eyes indicates one or more of: brightness adaptation, dynamic range perception, contrast sensitivity, and visual comfort, of the user's eyes, with respect to the HDR video content. Optionally, a processor of the at least one client device is configured to process gaze-tracking data, collected by a gaze-tracking means of the client device, to determine the gaze point of the user's eyes and/or the size of the pupils of the user's eyes. The gaze-tracking data is processed to determine gaze directions of the user's eyes, wherein the gaze point is a point of convergence of the gaze directions. The term "gaze-tracking means" refers to a specialized equipment for detecting and/or following a gaze of the user, when the at least one client device in operation is worn by the user. The gaze-tracking means could be implemented as contact lenses with sensors, cameras monitoring a position, a size and/or a shape of a pupil of a given eye of the user, and the like. Such gaze-tracking means are well-known in the art.

Furthermore, optionally, the processor of the at least one client device is configured to estimate the luminosity ranges receivable by the user's eyes, based on the size of the pupils of the user's eyes and calibration information. By monitoring how the size of the pupils changes upon viewing various pre-known luminosities in XR images, a luminosity perception of the user can be determined. The estimation of the luminosity ranges receivable by the user's eyes is based on this luminosity perception.

Optionally, a pose-tracking means of the at least one client device, in operation, collects the head-pose tracking data. The head-pose tracking data indicates the pose of the user's head, which provides insight of a perspective from which the user views an XR environment presented by the at least one client device. Herein, the term "pose" comprises position and/or orientation. The head-pose tracking data is optionally also indicative of at least one of: a velocity, an acceleration, a momentum, of the user's head. The pose-tracking means could be implemented as an internal component of the at least one client device (for example, such as an inertial measurement unit, a global positioning system receiver, or similar), as a tracking system external to the at least one client device (for example, such as a camera), or as a combination thereof (for example, such as a detector and a detectable object, one of which is arranged on/in the at least one client device and the other of which is external to the at least one client device).

Optionally, the processor of the at least one client device is configured to process sensor data, collected by at least one light sensor arranged on the at least one client device and/or in the real-world environment where the real-world images are captured, to determine the lighting conditions in said real-world environment.

The term "display screen capabilities" refers to specifications of the at least one display of the at least one client device that determine its ability to show the HDR visual content. Optionally, the display screen capabilities include one or more of: peak brightness (expressed, for example, in nits), black level (expressed, for example, in nits), contrast ratio, a colour gamut, bit depth of colour channels (i.e., colour components), HDR format support, HDR certification, of the at least one display. Some examples of the colour gamut include, but are not limited to, sRGB, AdobeRGB, DCI-P3, and Rec.2020.

Throughout the present disclosure, the term "HDR mastering" refers to a process of optimizing and adjusting high dynamic range (HDR) content for displaying. The HDR mastering involves adjusting and applying various HDR mastering parameters to each HDR image, in order to ensure that each HDR image is presented at the at least one display in a best possible way. Herein, the adjustment of the HDR mastering parameters is performed individually for each HDR image within the HDR video content, since different HDR images may have different characteristics which need to be optimized differently. The adjustment of the HDR mastering parameters is performed based on essential characteristics of each HDR image (such as at least the dynamic range and the colour characteristics) and the viewing conditions in the first metadata from the at least one client devices, so that each HDR image is optimized not only with respect to its own characteristics but also with respect to how it will be viewed at the at least one client device. This personalized adjustment of HDR mastering parameters based also on the viewing conditions, enables an enhancement in an overall quality of an XR video streaming experience.

Optionally, the HDR mastering parameters comprise at least one of: a shape of a tone-mapping curve, parameters of a tone-mapping curve, a luminosity range, colour characteristics, overall brightness, chromaticity, a shape of a gamma curve. Such HDR mastering parameters are beneficially adjustable to adjust a visual quality of the HDR video content. Each of these HDR mastering parameters is described in detail below.

In this regard, the "tone-mapping curve" refers to a graphical representation of how luminance values in the dynamic range of an HDR image are mapped to a limited luminance range of the at least one display, while preserving as much detail and visual fidelity as possible. The tone-mapping curve may also impact colour reproduction across various luminance levels. The shape of the tone-mapping curve determines how highlights and shadows in HDR image are compressed (or expanded) to fit within the limited luminance range. Adjusting the shape of the tone-mapping curve affects how much detail is retained in highlights and shadows upon such fitting. Such adjustment can be made by manipulating control points along the curve to achieve a required combination of preservation of detail, highlights, contrast, and colour reproduction. The shape of the tone-mapping curve may be adjusted by adjusting at least one of: a slope, a curvature, of the tone-mapping curve. Subsequently, adjusting the parameters of the tone-mapping curve involves optimizing the mapping of luminance values from HDR image to the display's capabilities. This adjustment provides an accurate, visually pleasing, and precise representation of the HDR content on the display.

Notably, the "luminosity range" encompasses a plurality of luminosity values that lie between a lowest luminosity value and a highest luminosity value of pixels in an HDR image. Herein, adjusting the luminosity range for the HDR image ensures that brightness levels (i.e., luminosities) in the HDR image are adjusted such that a quality of viewing the HDR image is optimized according to image content and viewing conditions.

Increasing the luminosity range expands the dynamic range of the HDR image which results in more visual detail being captured in dark and bright regions of the HDR image, and vice versa.

The colour characteristics can be adjusted for dynamically adapting HDR colour mapping to provide colour vividness and accuracy for each HDR image, given the viewing conditions. This ensures that the HDR content appears visually pleasant to the user. Furthermore, adaptive algorithms may dynamically adjust the colour characteristics based on dynamic range (i.e., the luminosity range) variations in different HDR images, ensuring consistent colour representation across the HDR video content.

The "overall brightness" for each HDR image refers to an overall luminance of said HDR image. The overall luminance could be an average luminance value of pixels in said HDR image, a perceived luminance value of said HDR image, or similar. Notably, the dynamic range variations in the HDR video content result in scenes with varying brightness ranging from extremely bright highlights to deep shadows, therefore adjusting the overall brightness could be performed to compensate for these variations to maintain a balanced luminance distribution across the HDR video content, to enhance perception of a particular portion of the dynamic range in a given HDR image, or similar. The colour characteristics can also impact the overall brightness. For example, in a highly saturated image with vibrant colours, adjusting the overall brightness may be performed while also adjusting the colour characteristics to ensure that the colours remain vivid without appearing too intense. Additionally, for example, if the first metadata indicates that the at least one display has limited peak brightness, then the overall brightness is adjusted accordingly. The effect of adjusting the overall brightness includes improved visibility of details, enhanced visual comfort, and a balanced representation of the HDR video content at the at least one client device.

The "chromaticity" of an HDR image refers to colour information present in the HDR image, specifically without considering its luminance. Adjusting the chromaticity may involve one or more of: scaling and/or shifting colour values to fit within a colour space, colour grading, colour mapping, and the like. As an example, the chromaticity of each HDR image may be adjusted for colour information therein to match the colour characteristics of the at least one display or a desired colour reproduction standard. Such adjusting may involve manipulating the colour information of HDR image to ensure that its colours fit within the colour gamut of the at least one display. In another example, if the first metadata is indicative of the lighting conditions in said real-world environment, then the chromaticity adjustments may be adjusted to align with these lighting conditions for the user's visual comfort. The effect of adjusting the chromaticity prevents colour clipping and ensures that the full range of available colours is represented within the display screen capabilities.

The "gamma curve" refers to a mathematical function that, when applied to pixel values of an HDR image, optimizes the HDR image for viewing (on the at least one display). The shape of the gamma curve indicates how the pixel values are transformed to achieve a desired output on the at least one display. Herein, the dynamic range variations in the HDR content necessitate adjustments to the shape of the gamma curve to ensure that the full range of luminance values (and optionally, the full range of colours) in each HDR image is accurately and perceptually represented on the at least one display. For example, an original shape of the gamma curve may have a high exponent for an extended dynamic range of the HDR video content by the at least one display may have a smaller dynamic range. Thus, adjusting the shape of the gamma curve to a lower exponent compresses the luminance values in the HDR video content, making suitable for display according to the at least one display's limited brightness range.

Optionally, when adjusting the HDR mastering parameters for each HDR image, the at least one server is configured to perform at least one of:
    adjust a shape of a tone-mapping curve that is to be employed when performing the HDR mastering, based on the gaze point of the user's eyes and on the size of pupils of the user's eyes;
    adjust a maximum luminosity value in a luminosity range that is to be employed when performing the HDR mastering, based on a maximum producible brightness of the at least one display, wherein the display screen capabilities are indicative of the maximum producible brightness of the at least one display;
    estimate one or more regions of said HDR image which are likely to be fully-occluded using the head-pose tracking data, and exclude the one or more regions from consideration when adjusting a given HDR mastering parameter.

In this regard, each of the aforesaid adjustments enables a significant improvement in visual quality of the HDR video content that is viewed (as a constituent of the plurality of XR images) at the at least one client device. The optional adjustment of the shape of the tone-mapping curve based on the gaze point of the user's eyes and the size of pupils of the user's eyes enhances the visual experience of the user by preserving visual details across a dynamic range of objects that the user is actively focusing on. Moreover, the size of pupils of the user's eyes indicates brightness perceived by the user's eyes, so the shape of the tone-mapping curve is beneficially adjusted on this basis for providing visual comfort to the user. For example, the user may be looking at a bright object in a central region of the XR environment and there may also be another bright object in a peripheral region of the XR environment. The shape of the tone-mapping curve may be adjusted to assign less importance to luminance and colour detail preservation of the another bright object in the peripheral area, as compared to the bright object in the central region. Notably, the user's pupil accommodation is not fully dependent on the HDR video content being transported, as the user may be focusing on (possibly very bright) real-world areas instead of the (virtual) transported content areas. The shape of the tone-mapping curve may also be adjusted to take this into account, and thus can beneficially also reduce distractions from bright objects in the user's real-world environment for maintaining focus on the gaze point.

Furthermore, when the at least one server optionally adjusts the maximum luminosity value in the luminosity range that is to be used during the HDR mastering, based on the display's maximum brightness, it is beneficially ensured that a full brightness range of the at least one display is utilised for displaying an extended dynamic range of the HDR video content. For example, the at least one display may be capable of producing brightness levels up to 500 nits, but the HDR video content may include varying luminosity levels of up to 1000 nits. In this case, the at least one server then considers the at least one display's maximum producible brightness of 500 nits and adjusts the maximum luminosity value of 1000 nits accordingly so that the varying levels of brightness in HDR images can be shown within the range of brightness levels that the at least one display can produce. Notably, the capabilities of the at least one display can set practical limits on the dynamic range of luminosity values that are transported from the at least one server to the at least one client, in the context of the HDR video content. This is because the at least one display can have physical constraints that limit the range of brightness that it can effectively represent. The transport of luminosity values beyond the display's maximum brightness can result in visual issues such as clipping, where brightness details in bright areas are lost. The aforesaid adjustment of the maximum luminosity value employed for HDR mastering effectively prevents such visual issues.

Moreover, the at least one server optionally estimates the one or more regions of a current HDR image that are likely to be fully-occluded, based on a previous HDR image that was processed at the at least one client device, a previous pose of the user's head at a time of displaying a previous XR image composed using the previous HDR image, and one or more regions of the previous HDR image which were occluded by other visual content. In this regard, the previous pose of the user's head is determined using the head-pose tracking data. For example, if the previous pose of the user is towards a right-side of an XR environment, and certain regions on the right-side were consistently occluded fully by real-world objects in the past, those regions may be estimated as likely to be fully occluded in the current HDR image. Beneficially, the exclusion of the estimated one or more regions from consideration during HDR mastering is performed to focus HDR mastering parameter adjustment according to visible regions of the HDR image, for optimizing a visual quality and processing resource utilization for those image regions that are actually seen by the user. When a region of the HDR image which would be fully occluded would not influence HDR mastering, it will not impact HDR mastering parameter settings/values in a manner which adversely impacts a visual quality of other visible regions of the HDR image. This approach contributes to a more targeted adjustment ensuring that the HDR enhancements are applied where they are perceptually relevant hence improving the overall quality of the visible regions of each HDR image.

When the HDR mastering is performed for the plurality of HDR images according to the adjusted HDR mastering parameters, the plurality of HDR images are prepared for presentation (on the at least one client device) such that their dynamic range and colour characteristics are well-reproducible at the at least one client device given the viewing conditions at the at least one client device, for providing a high-quality HDR video content viewing experience to the user.

Next, the plurality of HDR images are compressed to enable efficient bandwidth usage and faster transmission (as compared to un-compressed transmission). In this regard, pixels of each HDR image are down sampled to generate pixels of a corresponding compressed HDR image. When compressing the plurality of HDR images, the at least one server is configured to employ at least one image compression algorithm. Optionally, the at least one compression algorithm is at least one of: a High Efficiency Video Coding (also known as H.265 and MPEG-H Part 2) algorithm, H. 263 algorithm, H.264 algorithm. As an example, the compression algorithm may be based on Discrete Cosine Transform. Compression algorithms are well-known in the art. It will be appreciated that compression settings of the at least one image compression algorithm are selected to preserve a quality of the plurality of HDR images to a high degree (i.e., with negligible or minimal losses and/or artifacts).

The plurality of compressed HDR images, obtained upon such compression, are sent along with the second metadata to the at least one client device, via the communication interface. The at least one server streams the plurality of compressed HDR images and the second metadata to the at least one client device. The "second metadata" refers to metadata that is received by the at least one client device from the at least one server, such metadata being beneficially utilised by the at least one client device for processing the plurality of decompressed HDR images such that HDR content therein has a dynamic range and colour characteristics that are close to the (original) HDR video content.

Optionally, the second metadata comprises at least HDR mastering-related metadata. Optionally, the HDR mastering-related metadata comprises at least one of: maximum content luminance level, minimum content luminance level, maximum average luminance level, minimum average luminance level, bit depth of colour components in the plurality of compressed HDR images, HDR format, a shape of a tone-mapping curve, transfer function for encoding HDR content. The HDR mastering-related metadata includes specifications of the HDR mastering performed on each HDR image by the at least one server. The HDR mastering-related metadata enables the at least one client device to interpret (and further process) HDR images correctly.

Optionally, the second metadata further comprises compression-related metadata. In this regard, when decompressing the plurality of compressed HDR images, the at least one server utilises the second metadata. Optionally, the compression-related metadata comprises at least one of: compression format, compression quality, image format, image resolution. It will be appreciated that the second metadata could optionally further comprise at least one of: display compatibility-related metadata, content-related metadata, additional relevant metadata.

It will be appreciated that the at least one client device receives a stream of the plurality of compressed HDR images and the second metadata. In this way, each compressed HDR image that is received, is generated in an up-to-date manner according to its latest corresponding first metadata.

Optionally, when decompressing the plurality of compressed images, the at least one client device is configured to employ at least one image decompression algorithm. Such decompression algorithms are well-known in the art. Optionally, the at least one image decompression algorithm utilises the compression-related metadata (in the second metadata). This facilitates in accurately reproducing original un-compressed HDR content, in the plurality of decompressed HDR images, to a high degree. The plurality of decompressed HDR images are required to be post-processed, in order for the HDR content therein to be reproduced accurately upon displaying. Such post-processing is described below.

The "pixel values" in the plurality of decompressed HDR images refers to values of colour components (in a colour space) for pixels of the plurality of decompressed HDR images. The translation of the pixel values into the colour values that are to be used for displaying enables in accurately reproducing the dynamic range and the colour characteristics of the HDR video content on the at least one display. The second metadata enables in accurately making said translation, since the specifics of the HDR mastering are mapped to a maximum extent feasible (according to the display screen capabilities).

Optionally, when translating the pixel values in the plurality of decompressed HDR images, the at least one client device is configured to at least map luminosity values in the pixel values to brightness values of the at least one display. The brightness values of the at least one display may be expressed in nits. For example, the luminosity values may be given by the Y colour component values (for YUV colour space HDR images), linear luminance values determined based on RGB colour component values (for YUV colour space HDR images), or similar.

Furthermore, optionally, when translating the pixel values in the plurality of decompressed HDR images, the at least one client device is configured to perform at least one of:

apply a gamma correction to the plurality of decompressed HDR images;

convert the colour space of the plurality of decompressed
   HDR images to match the colour gamut of the at least
   one display;
map colour component values in the pixel values to colour
   values in the colour gamut of the at least one display;
adjust out-of-gamut colour component values in the pixel
   values to a closest colour value in the colour gamut of
   the at least one display.

In this regard, the optional application of the gamma
correction can beneficially have secondary effects on colour
rendition, since because colour perception is closely related
to luminance. When the gamma correction is applied to a
decompressed HDR image, it alters a relationship between
an intensity of light and a perceived brightness of colours.
This means that while primarily optimizing luminance val-
ues for display, the gamma adjustment can also affect
saturation, contrast, tonal range, and vibrancy of colours in
the decompressed HDR image.

Furthermore, optionally, when mapping the colour com-
ponent values in the pixel values to colour values in the
colour gamut of the at least one display, the at least one
client device is configured to employ a mapping function.
Optionally, in this regard, the mapping function is adjustable
according to a density pattern of the colour component
values. Optionally, the mapping function is a parametric
function.

The real-world images represent one or more real-world
objects that are present in a real-world environment. Option-
ally, the at least one client device is present in the real-world
environment, wherein the at least one client device com-
prises the at least one camera. Alternatively, optionally, an
imaging system comprising the at least one camera is
present in the real-world environment, wherein the imaging
system sends the real-world images to the at least one client
device. The imaging system can be implemented in a
teleport device.

Optionally, the at least one camera is implemented as at
least one visible light camera. Examples of a given visible
light camera include, but are not limited to, a Red-Green-
Blue-Depth (RGB), a monochrome camera. It will be appre-
ciated that the at least one camera could be implemented as
a combination of the given visible light camera and a depth
camera. Examples of the depth camera include, but are not
limited to, a Red-Green-Blue-Depth (RGB-D) camera, a
ranging camera, a Light Detection and Ranging (LIDAR)
camera, a flash LiDAR camera, a Time-of-Flight (ToF)
camera, a Sound Navigation and Ranging (SONAR) camera,
a laser rangefinder, a stereo camera, a plenoptic camera, an
infrared camera, a structured-light scanner, and an ultra-
sound imaging equipment. For example, the at least one
camera may be implemented as the stereo camera.

The real-world images and the plurality of decompressed
HDR images are processed by an extended-reality composi-
tor executed on the at least one client device, to compose the
plurality of XR images. Composing the plurality of XR
images comprises at least blending the real-world images
and the plurality of decompressed HDR images using at
least one image processing technique (for example such as
alpha blending, depth compositing, colour correction, and
similar). This compositing process ensures that virtual
objects (represented optionally in the plurality of decom-
pressed HDR images) appear naturally integrated with the
real-world environment, taking into account lighting, shad-
ows, reflections, occlusions, and the like.

Optionally, the plurality of XR images are composed also
using at least one virtual-reality image. The at least one VR
image represents virtual content that is to be present in the XR environment (constituted by the plurality of XR
images). The at least one VR image could be rendered by the
at least one client device, the at least one server, or an
external server. The virtual content in the at least one VR
image may fully occlude one or more regions of the HDR
video content.

The at least one client device beneficially sends the
(latest) first metadata to the at least one server, so that said
first metadata could be utilized for accurately adjusting the
HDR mastering parameters for the next HDR video content
(which could be a next HDR image succeeding a current
HDR image in the plurality of HDR images of the HDR
video content, or a next plurality of HDR images). The
(latest) first metadata could optionally also be utilised at the
previous step of composing the plurality of XR images.

The plurality of XR images are displayed according to a
given frame rate, on the at least one display. The given frame
rate could, for example, be 45 frames per second (FPS), 60
FPS, 75 FPS, 90 FPS, 120 FPS, and the like. It will be
appreciated that such displaying provides a visually stun-
ning, realistic and immersive XR viewing experience, since
HDR virtual content (from the HDR video content) has a
high dynamic range and expanded colour gamut (which
leads to vivid colours in the XR images).

Optionally, the at least one client device is further con-
figured to:
   generate image composition information comprising vis-
      ibility characteristics of the plurality of decompressed
      HDR images in the plurality of XR images; and
   send, to the at least one server, the image composition
      information to be utilised for the next HDR video
      content,
   and wherein the at least one server is further configured
      to:
   receive, from the at least one client device, the image
      composition information; and
   adjust HDR mastering parameters for at least one next
      HDR image, based also on the visibility characteristics.

In this regard, the image composition information is
generated for subsequent use in the adjustment of the HDR
mastering parameters for the next HDR video content. The
image composition information describes how the plurality
of XR images are composed at the at least one client device
(i.e., image composition results), with respect to how occlu-
sions (or visibility) occur between visual content represented
in the plurality of decompressed HDR images and visual
content represented in the real-world images. In this way, the
at least one next HDR image is processed (i.e., HDR
mastered) by the at least one server, according to how the
occlusions occurred in at least one previous decompressed
HDR image. This provides a realistic and adaptive XR
viewing experience. The image composition information
can be very useful in accurately adjusting the HDR master-
ing parameters differently for different regions of the at least
one next HDR image, or excluding certain regions of the at
least one next HDR image from consideration when adjust-
ing the HDR mastering parameters, or similar, such that it
leads to requisite emphasis or de-emphasis of specific
regions of the at least one next HDR image (and optionally,
processing resource savings), based on their occlusion state.
In other words, when the HDR mastering parameters are
adjusted based also on the visibility characteristics, their
settings/values are correctly optimized so that visual quality
in fully and partially visible regions is not compromised for
improvement of visual quality in invisible regions. Option-
ally, the image composition information is streamed from
the at least one client device to the at least one server.

Optionally, in this regard, the image composition information is sent along with the first metadata.

Optionally, the visibility characteristics of a given decompressed image in a given XR image are indicative of at least one of:

a first region of the given decompressed HDR image that is fully visible in the given XR image;

a second region of the given decompressed HDR image that is fully occluded by at least one of: a corresponding real-world image, a virtual-reality image, in the given XR image;

a third region of the given decompressed HDR image that is partially-occluded by at least one of: a corresponding real-world image, a virtual-reality image, in the given XR image.

In this regard, the first region is unoccluded in the given XR image, meaning that visual content rendered therein by the at least one server, is fully visible to the user. The second region is fully occluded in the given XR image, meaning that visual content rendered therein by the at least one server, is invisible to the user. The third region is partially occluded in the given XR image, meaning that some visual content in the third region is visible to the user while other visual content is occluded by real-objects and/or other virtual objects, resulting in partial occlusion and partial visibility of the third region to the user. The at least one client device beneficially adjusts the HDR mastering parameters according to the aforementioned regions indicated in the visibility characteristics, for enabling accurate granular optimization and improvement of visual quality in perceivable regions of each HDR image. A technical effect of indicating such regions in the visibility characteristics is that such optimization and improvement of the visual quality can be implemented accurately.

Optionally, when adjusting the HDR mastering parameters for a given next HDR image based also on the visibility characteristics, the at least one server is configured to perform at least one of:

adjust at least one of: parameters of a tone-mapping curve, a luminosity range, colour characteristics, for each pixel in at least one region of the given next HDR image that is to be fully visible or be partially-occluded in a corresponding next XR image, based on a distance of said pixel from a gaze point of the user's eyes;

adjust at least one of: an overall brightness, a chromaticity, for each HDR image, based on a luminosity of at least one region of the given next HDR image that is to be fully visible or be partially-occluded in a corresponding XR image;

adjust brightness mapping parameters to be dependent only on at least one region of the given HDR image that is to be fully visible or be partially-occluded in a corresponding XR image.

In this regard, the HDR mastering parameters for the at least one next HDR image may optionally be adjusted according to the first region and/or the third region of the given decompressed HDR image. In other words, the at least one region of the given next HDR image that is to be fully visible or be partially-occluded in the corresponding next XR image matches at least one of: the first region, the third region, of the given decompressed HDR image. Such adjustments beneficially effectively enhance visual quality in visible regions of the next HDR video content, in an accurate, reliable, and processing resource efficient manner.

It will be appreciated that optionally, the at least one of: the parameters of the tone-mapping curve, the luminosity range, and the colour characteristics are adjusted in the aforesaid manner to achieve quality optimization in visible regions of the given next HDR image, in a manner that is weighted according to distance from the gaze point where the user is likely to focus. Notably, this approach enhances an overall viewing experience by prioritizing HDR parameter adjustment according to visible pixels including and surrounding the gaze point over other visible pixels which are farther from the gaze point. This means an extent of adjustment of the aforesaid parameter(s) for the visible pixels reduces when going farther away from the gaze point. Herein, each pixel in the at least one region of the given next HDR image that is to be fully visible or be partially-occluded in the corresponding next XR image is referred to as "visible pixel".

Furthermore, it will be appreciated that optionally the luminosity of the at least one region of the given next HDR image that is to be fully visible or be partially-occluded in the corresponding XR image is used as a basis for adjusting the overall brightness and/or the chromaticity for each HDR image, to provide an optimal visual quality in each HDR image. If the adjustment of the overall brightness and/or the chromaticity is performed on the basis of luminosity of invisible regions (i.e., fully-occluded regions) in the given next HDR image, there is produced an adverse impact on the visual quality. For example, if the invisible regions represented bright objects and the luminosity of the invisible regions is used as a basis for adjusting the overall brightness, the overall brightness would be increased at a cost of loss of visual quality of darker objects (which may have been present in the at least one region), thereby undesirably lowering the visual quality. Optionally, if the luminosity of the at least one region of the given next HDR image indicates under-illumination or insufficient brightness, the at least one server is configured to increase the overall brightness, and vice versa. A technical effect of adjusting the chromaticity based on the luminosity information of the at least one region of the given next HDR image, is that it enables in maintaining proper colour balance (i.e., colour consistency), avoiding colour shifts, optimizing colour appearance and preserving colour detail, in the given next HDR image. Such benefits are provided particularly in the at least one region that is visible to the user.

Moreover, optionally when the HDR video content is the VR video content, a majority part of each HDR image is empty. So, in this regard, the brightness mapping parameters are optionally adjusted based only on the at least one region of the given next HDR image, to ensure optimal utilization of the brightness range of the at last one display according to the dynamic range of visible part(s) of each HDR image. In this way, the empty parts each HDR image do not have any adverse impact on brightness mapping, resulting in improved visual quality.

Optionally, the at least one client device comprises a plurality of client devices that are communicably coupled to the at least one server for simultaneously streaming the HDR video content, and wherein the at least one server is further configured to perform one of:

determine a target viewing condition of the HDR video content, based on a plurality of viewing conditions indicated in a plurality of first metadata received from the plurality of client devices; or determine at least one priority viewing condition of the HDR video content, from amongst a plurality of viewing conditions indicated in a plurality of first metadata received from the plurality of client devices, and wherein a portion of the plurality of first metadata that is indicative of: the target viewing condition, the at least one priority viewing condition, is employed as the first metadata when adjusting the HDR mastering parameters.

In this regard, the at least one server effectively and efficiently handles the HDR video streaming for the plurality of client devices, by adopting one suitable approach from the two approaches mentioned above. Both these approaches aim to maximise visual quality of the HDR video content simultaneously for multiple client devices. It will be appreciated that the portion of the plurality of first metadata is a selected subset of the first metadata provided by the plurality of client devices as this subset contains information that is indicative of either the target viewing condition or the at least one priority viewing condition.

The term "target viewing condition" refers to a viewing condition that is to be used as a reference (or target) for mastering the HDR video content, by taking into account the plurality of viewing conditions. Herein, determining the target viewing condition involves analysing and integrating (i.e., combining) the preferences and requirements of each client device. For example, the plurality of client devices may be a plurality of XR headsets, wherein each XR headset sends its first metadata to the at least one server. When determining the target viewing condition, the at least one server may identify common areas of interest of users of the plurality of XR headsets, common preferences, or similar. As an example, if the majority of users are focusing on a specific region of the XR environment, the target viewing condition may prioritize adjustments that enhance visual quality in that particular region. Beneficially, determining the target viewing condition enables the at least one server to coordinate the adjustment of the HDR mastering parameters according to each client device, thus ensuring a consistent and coherent viewing experience across the plurality of client devices. Furthermore, optimization of the HDR mastering parameters based on the target viewing conditions contributes to a more engaging and immersive experience for multiple users as it visually aligns the presentation of the HDR video content according to the plurality of viewing conditions.

Alternatively, the term "priority viewing condition" refers to a viewing condition that is to be prioritised over other viewing conditions amongst the plurality of viewing conditions. Herein, the at least one priority viewing condition may be determined based on at least one of a predefined priority order, a set of rules for determining priorities, user preferences, usage data, a time of joining XR viewing experience, authorization levels, or similar. For example, a viewing condition of a user having highest authorization level may be determined as the at least one priority viewing condition. Using the at least one priority viewing condition for adjusting the HDR mastering parameters simplifies how HDR mastering is performed for the plurality of client devices as all viewing conditions need not be taken into account when performing HDR mastering. This is useful in cases where the plurality of viewing conditions are considerably different from one another and accommodating all such viewing conditions is infeasible. Additionally, in cases where the plurality of client devices are operating in a collaborative mode, in an instructional mode, in a broadcast mode (for example one primary device and multiple spectator devices), or similar, employing the at least one priority viewing condition for adjusting the HDR mastering parameters provides a requisite visual experience to all client devices.

The present disclosure also relates to the video streaming method as described above. Various embodiments and variants disclosed above, with respect to the aforementioned video streaming system, apply mutatis mutandis to the video streaming method.

Optionally, in the video streaming method, the first metadata comprises at least one of: a gaze point of a user's eyes, a size of pupils of the user's eyes, estimated luminosity ranges receivable by the user's eyes, head-pose tracking data indicative of at least a pose of the user's head, lighting conditions in a real-world environment where the real-world images are captured, display screen capabilities. Each of these constituents of the first metadata effectively describe a viewing condition which significantly impacts a quality with which the HDR video content is viewed at the at least one client device.

Optionally, in the video streaming method, the step of adjusting the HDR mastering parameters for each HDR image comprises performing at least one of:

adjusting a shape of a tone-mapping curve that is to be employed when performing the HDR mastering, based on the gaze point of the user's eyes and on the size of pupils of the user's eyes;

adjusting a maximum luminosity value in a luminosity range that is to be employed when performing the HDR mastering, based on a maximum producible brightness of the at least one display, wherein the display screen capabilities are indicative of the maximum producible brightness of the at least one display;

estimating one or more regions of said HDR image which are likely to be fully-occluded using the head-pose tracking data, and excluding the one or more regions from consideration when adjusting a given HDR mastering parameter. Each of the aforesaid adjustments enables a significant improvement in visual quality of the HDR video content that is viewed (as a constituent of the plurality of XR images) at the at least one client device.

Optionally, the video streaming method further comprises:

at the at least one client device generating image composition information comprising visibility characteristics of the plurality of decompressed HDR images in the plurality of XR images; and sending, to the at least one server, the image composition information to be utilised for the next HDR video content; and at the at least one server receiving, from the at least one client device, the image composition information; and adjusting HDR mastering parameters for at least one next HDR image, based also on the visibility characteristics. In this way, the at least one next HDR image is processed (i.e., HDR mastered) by the at least one server, according to how the occlusions occurred in at least one previous decompressed HDR image, to provide a realistic and adaptive XR viewing experience.

Optionally, in the video streaming method, the visibility characteristics of a given decompressed image in a given XR image are indicative of at least one of:

a first region of the given decompressed HDR image that is fully visible in the given XR image;

a second region of the given decompressed HDR image that is fully occluded by at least one of: a corresponding real-world image, a virtual-reality image, in the given XR image;

a third region of the given decompressed HDR image that is partially-occluded by at least one of: a corresponding real-world image, a virtual-reality image, in the given XR image. A technical effect of indicating such regions in the visibility characteristics is that granular optimization and improvement of visual quality in perceivable regions of each HDR image can be implemented accurately.

Optionally, in the video streaming method, the step of adjusting the HDR mastering parameters for a given next HDR image based also on the visibility characteristics, further comprises performing at least one of:

adjusting at least one of: parameters of a tone-mapping curve, a luminosity range, colour characteristics, for each pixel in at least one region of the given next HDR image that is to be fully visible or be partially-occluded in a corresponding next XR image, based on a distance of said pixel from a gaze point of the user's eyes;

adjusting at least one of: an overall brightness, a chromaticity, for each HDR image, based on a luminosity of at least one region of the given next HDR image that is to be fully visible or be partially-occluded in a corresponding XR image;

adjusting brightness mapping parameters to be dependent only on at least one region of the given HDR image that is to be fully visible or be partially-occluded in a corresponding XR image. Such adjustments beneficially effectively enhance visual quality in visible regions of the next HDR video content, in an accurate, reliable, and processing resource efficient manner.

Optionally, in the video streaming method, the HDR mastering parameters comprise at least one of: a shape of a tone-mapping curve, parameters of a tone-mapping curve, a luminosity range, colour characteristics, overall brightness, chromaticity, a shape of a gamma curve. Such HDR mastering parameters are beneficially adjustable to adjust a visual quality of the HDR video content.

Optionally, in the video streaming method, the at least one client device comprises a plurality of client devices that are communicably coupled to the at least one server for simultaneously streaming the HDR video content, and wherein the method further comprises performing, at the at least one server, one of:

determining a target viewing condition of the HDR video content, based on a plurality of viewing conditions indicated in a plurality of first metadata received from the plurality of client devices; or determining at least one priority viewing condition of the HDR video content, from amongst a plurality of viewing conditions indicated in a plurality of first metadata received from the plurality of client devices, and wherein a portion of the plurality of first metadata that is indicative of: the target viewing condition, the at least one priority viewing condition, is employed as the first metadata when adjusting the HDR mastering parameters. In this regard, the at least one server effectively and efficiently handles the HDR video streaming for the plurality of client devices, by adopting any of the aforesaid approaches to maximise visual quality of the HDR video content simultaneously for multiple client devices.

DETAILED DESCRIPTION OF THE DRAWINGS

Referring to FIG. 1, illustrated is a block diagram of an architecture of a video streaming system 100, in accordance with an embodiment of the present disclosure. The video streaming system 100 comprises at least one server (depicted as a server 102) and at least one client device (depicted as a client device 104). The client device 104 is communicably coupled to the server 102 via a communication interface 106.

It may be understood by a person skilled in the art that the FIG. 1 includes a simplified architecture of the video streaming system 100 for sake of clarity, which should not unduly limit the scope of the claims herein. The person skilled in the art will recognize many variations, alternatives, and modifications of embodiments of the present disclosure.

Figure 2:
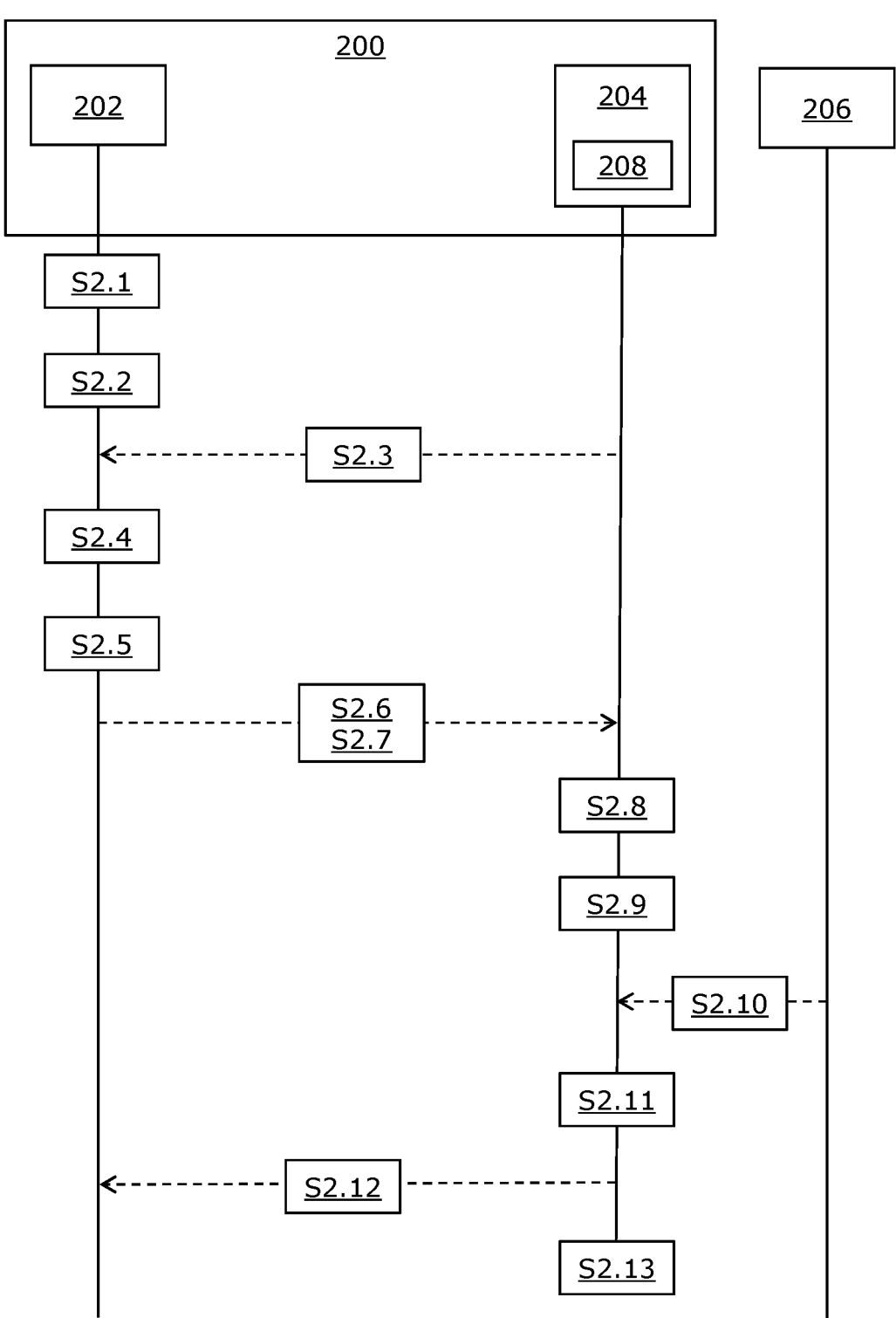
FIG. 2 illustrates steps of a video streaming method implemented by a video streaming system, in accordance with an embodiment of the present disclosure.

Referring to FIG. 2, illustrated are steps of a video streaming method implemented by a video streaming system 200, in accordance with an embodiment of the present disclosure. The video streaming system 200 comprises at least one server (depicted as a server 202) and at least one client device (depicted as a client device 204) that is communicably coupled to at least one server 202 via a communication interface (not shown). At S2.1, high dynamic range (HDR) video content comprising a plurality of HDR images is received at the server 202. At S2.2, a dynamic range and colour characteristics of each HDR image amongst the plurality of HDR images is analysed by the server 202. At S2.3, first metadata indicative of viewing conditions of the HDR video content is received from the client device 204, by the server 202. At S2.4, HDR mastering parameters for each HDR image are adjusted by the server 202, based at least on the dynamic range and the colour characteristics of said HDR image, and on the first metadata. At S2.5, HDR mastering is performed for the plurality of HDR images, by the server 202, according to the adjusted HDR mastering parameters, and the plurality of HDR images are compressed by the server 202 to obtain a plurality of compressed HDR images. At S2.6, the plurality of compressed HDR images and second metadata indicative of the adjusted HDR mastering parameters for each compressed HDR image are sent by the server 202 to the client device 204. At S2.7, the plurality of compressed HDR images and the second metadata are received by the client device 204 from the server 202. At S2.8, the plurality of compressed HDR images are decompressed at the client device 204 to obtain a plurality of decompressed HDR images. At S2.9, pixel values in the plurality of decompressed HDR images are translated at the client device 204, based on the second metadata, into colour values that are to be used for displaying such that upon displaying, pixel luminosities would match luminosities in the dynamic range. At S2.10, real-world images captured by at least one camera (depicted as a camera 206) are received at the client device 204. At S2.11, a plurality of extended reality (XR) images are composed using at least the plurality of decompressed HDR images and the real-world images, at the client device 204. At S2.12, at least the first metadata that is to be utilised for a next HDR video content to be streamed from the 202 to the client device 204, is sent from the client device 204 to the server 202. At S2.13, the plurality of XR images are displayed, on at least one display (depicted as a display 208) of the client device 204.

The aforementioned steps are only illustrative and other alternatives can also be provided where one or more steps are added, one or more steps are removed, or one or more steps are provided in a different sequence without departing from the scope of the claims herein. Moreover, the video streaming system 200 is exemplary only, which should not unduly limit the scope of the claims herein. The person skilled in the art will recognize many variations, alternatives, and modifications of embodiments of the present disclosure. For example, the client device 204 may comprise the camera 206.

The invention claimed is:

1. A video streaming system comprising:

at least one server; and at least one client device that is communicably coupled to the at least one server via a communication interface, wherein the at least one server is configured to:

receive high dynamic range (HDR) video content comprising a plurality of HDR images;

analyse a dynamic range and colour characteristics of each HDR image amongst the plurality of HDR images;

receive, from the at least one client device, first metadata indicative of viewing conditions of the HDR video content;

adjust HDR mastering parameters for each HDR image, based at least on the dynamic range and the colour characteristics of said HDR image, and on the first metadata;

perform HDR mastering for the plurality of HDR images according to the adjusted HDR mastering parameters, and compress the plurality of HDR images to obtain a plurality of compressed HDR images;

send, to the at least one client device, the plurality of compressed HDR images and second metadata indicative of the adjusted HDR mastering parameters for each compressed HDR image;

and wherein the at least one client device is configured to:

receive, from the at least one server, the plurality of compressed HDR images and the second metadata;

decompress the plurality of compressed HDR images to obtain a plurality of decompressed HDR images;

translate, based on the second metadata, pixel values in the plurality of decompressed HDR images, into colour values that are to be used for displaying such that upon displaying, pixel luminosities would match luminosities in the dynamic range;

receive real-world images captured by at least one camera;

compose a plurality of extended reality (XR) images using at least the plurality of decompressed HDR images and the real-world images;

send, to the at least one server, at least the first metadata to be utilised for a next HDR video content that is to be streamed from the at least one server to the at least one client device; and display the plurality of XR images, on at least one display of the at least one client device;

wherein the at least one client device is further configured to:

generate image composition information comprising visibility characteristics of the plurality of decompressed HDR images in the plurality of XR images; and send, to the at least one server, the image composition information to be utilised for the next HDR video content, and wherein the at least one server is further configured to:

receive, from the at least one client device, the image composition information; and adjust HDR mastering parameters for at least one next HDR image, based also on the visibility characteristics.

2. The video streaming system of claim 1, wherein the first metadata comprises at least one of: a gaze point of a user's eyes, a size of pupils of the user's eyes, estimated luminosity ranges receivable by the user's eyes, head-pose tracking data indicative of at least a pose of the user's head, lighting conditions in a real-world environment where the real-world images are captured, display screen capabilities.

3. The video streaming system of claim 2, wherein when adjusting the HDR mastering parameters for each HDR image, the at least one server is configured to perform at least one of:

adjust a shape of a tone-mapping curve that is to be employed when performing the HDR mastering, based on the gaze point of the user's eyes and on the size of pupils of the user's eyes;

adjust a maximum luminosity value in a luminosity range that is to be employed when performing the HDR mastering, based on a maximum producible brightness of the at least one display, wherein the display screen capabilities are indicative of the maximum producible brightness of the at least one display;

estimate one or more regions of said HDR image which are likely to be fully-occluded using the head-pose tracking data, and exclude the one or more regions from consideration when adjusting a given HDR mastering parameter.

4. The video streaming system of claim 1, wherein the visibility characteristics of a given decompressed image in a given XR image are indicative of at least one of:

a first region of the given decompressed HDR image that is fully visible in the given XR image;

a second region of the given decompressed HDR image that is fully occluded by at least one of: a corresponding real-world image, a virtual-reality image, in the given XR image;

a third region of the given decompressed HDR image that is partially-occluded by at least one of: a corresponding real-world image, a virtual-reality image, in the given XR image.

5. The video streaming system of claim 1, wherein when adjusting the HDR mastering parameters for a given next HDR image based also on the visibility characteristics, the at least one server is configured to perform at least one of:

adjust at least one of: parameters of a tone-mapping curve, a luminosity range, colour characteristics, for each pixel in at least one region of the given next HDR image that is to be fully visible or be partially-occluded in a corresponding next XR image, based on a distance of said pixel from a gaze point of the user's eyes;

adjust at least one of: an overall brightness, a chromaticity, for each HDR image, based on a luminosity of at least one region of the given next HDR image that is to be fully visible or be partially-occluded in a corresponding XR image;

adjust brightness mapping parameters to be dependent only on at least one region of the given HDR image that is to be fully visible or be partially-occluded in a corresponding XR image.

6. The video streaming system of claim 1, wherein the HDR mastering parameters comprise at least one of: a shape of a tone-mapping curve, parameters of a tone-mapping curve, a luminosity range, colour characteristics, overall brightness, chromaticity, a shape of a gamma curve.

7. The video streaming system of claim 1, wherein the at least one client device comprises a plurality of client devices that are communicably coupled to the at least one server for simultaneously streaming the HDR video content, and wherein the at least one server is further configured to perform one of:

determine a target viewing condition of the HDR video content, based on a plurality of viewing conditions indicated in a plurality of first metadata received from the plurality of client devices; or determine at least one priority viewing condition of the HDR video content, from amongst a plurality of viewing conditions indicated in a plurality of first metadata received from the plurality of client devices, and wherein a portion of the plurality of first metadata that is indicative of: the target viewing condition, the at least one priority viewing condition, is employed as the first metadata when adjusting the HDR mastering parameters.

8. A video streaming method implemented by a video streaming system comprising at least one server and at least one client device that is communicably coupled to the at least one server via a communication interface, wherein the method comprises:

at the at least one server receiving high dynamic range (HDR) video content comprising a plurality of HDR images;

analysing a dynamic range and colour characteristics of each HDR image amongst the plurality of HDR images;

receiving, from the at least one client device, first metadata indicative of viewing conditions of the HDR video content;

adjusting HDR mastering parameters for each HDR image, based at least on the dynamic range and the colour characteristics of said HDR image, and on the first metadata;

performing HDR mastering for the plurality of HDR images according to the adjusted HDR mastering parameters, and compressing the plurality of HDR images for obtaining a plurality of compressed HDR images; and sending, to the at least one client device, the plurality of compressed HDR images and second metadata indicative of the adjusted HDR mastering parameters for each compressed HDR image; and at the at least one client device receiving, from the at least one server, the plurality of compressed HDR images and the second metadata;

decompressing the plurality of compressed HDR images for obtaining a plurality of decompressed HDR images;

translating, based on the second metadata, pixel values in the plurality of decompressed HDR images, into colour values that are to be used for displaying such that upon displaying, pixel luminosities would match luminosities in the dynamic range;

receiving real-world images captured by at least one camera (206);

composing a plurality of extended reality (XR) images using at least the plurality of decompressed HDR images and the real-world images;

sending, to the at least one server, at least the first metadata to be utilised for a next HDR video content that is to be streamed from the at least one server to the at least one client device; and displaying the plurality of XR images, on at least one display of the at least one client device;

wherein the method further comprises:

at the at least one client device generating image composition information comprising visibility characteristics of the plurality of decompressed HDR images in the plurality of XR images; and sending, to the at least one server, the image composition information to be utilised for the next HDR video content; and at the at least one server receiving, from the at least one client device, the image composition information; and adjusting HDR mastering parameters for at least one next HDR image, based also on the visibility characteristics.

9. The video streaming method of claim 8, wherein the first metadata comprises at least one of: a gaze point of a user's eyes, a size of pupils of the user's eyes, estimated luminosity ranges receivable by the user's eyes, head-pose tracking data indicative of at least a pose of the user's head, lighting conditions in a real-world environment where the real-world images are captured, display screen capabilities.

10. The video streaming method of claim 9, wherein the step of adjusting the HDR mastering parameters for each HDR image comprises performing at least one of:

adjusting a shape of a tone-mapping curve that is to be employed when performing the HDR mastering, based on the gaze point of the user's eyes and on the size of pupils of the user's eyes;

adjusting a maximum luminosity value in a luminosity range that is to be employed when performing the HDR mastering, based on a maximum producible brightness of the at least one display, wherein the display screen capabilities are indicative of the maximum producible brightness of the at least one display;

estimating one or more regions of said HDR image which are likely to be fully-occluded using the head-pose tracking data, and excluding the one or more regions from consideration when adjusting a given HDR mastering parameter.

11. The video streaming method of claim 8, wherein the visibility characteristics of a given decompressed image in a given XR image are indicative of at least one of:

a first region of the given decompressed HDR image that is fully visible in the given XR image;

a second region of the given decompressed HDR image that is fully occluded by at least one of: a corresponding real-world image, a virtual-reality image, in the given XR image;

a third region of the given decompressed HDR image that is partially-occluded by at least one of: a corresponding real-world image, a virtual-reality image, in the given XR image.

12. The video streaming method of claim 8, wherein the step of adjusting the HDR mastering parameters for a given next HDR image based also on the visibility characteristics, further comprises performing at least one of:

adjusting at least one of: parameters of a tone-mapping curve, a luminosity range, colour characteristics, for each pixel in at least one region of the given next HDR image that is to be fully visible or be partially-occluded in a corresponding next XR image, based on a distance of said pixel from a gaze point of the user's eyes;

adjusting at least one of: an overall brightness, a chromaticity, for each HDR image, based on a luminosity of at least one region of the given next HDR image that is to be fully visible or be partially-occluded in a corresponding XR image;

adjusting brightness mapping parameters to be dependent only on at least one region of the given HDR image that is to be fully visible or be partially-occluded in a corresponding XR image.

13. The video streaming method of claim 8, wherein the at least one client device comprises a plurality of client devices that are communicably coupled to the at least one server for simultaneously streaming the HDR video content, and wherein the method further comprises performing, at the at least one server, one of:

determining a target viewing condition of the HDR video content, based on a plurality of viewing conditions indicated in a plurality of first metadata received from the plurality of client devices; or determining at least one priority viewing condition of the HDR video content, from amongst a plurality of viewing conditions indicated in a plurality of first metadata received from the plurality of client devices, and wherein a portion of the plurality of first metadata that is indicative of: the target viewing condition, the at least one priority viewing condition, is employed as the first metadata when adjusting the HDR mastering parameters.

\* \* \* \* \*